3,507,889
PROCESS FOR THE PREPARATION OF 17α-DIHYDROEQUILENIN AND RELATED COMPOUNDS

David J. Marshall, Hampstead, Quebec, Canada, assignor to American Home Products Corporation, New York, N.Y., a corporation of Delaware
No Drawing. Filed June 11, 1968, Ser. No. 735,978
Int. Cl. C07c 167/26
U.S. Cl. 260—397.5     3 Claims

ABSTRACT OF THE DISCLOSURE

There is a disclosed herein a process for preparing 17α-dihydroequilenin comprising reacting the benzyl or 2-tetrahydropyranyl ether or equilenin with an aryl sulfonylhydrazide to obtain the corresponding sulfonyl hydrazone, treating the latter with lithium aluminium hydride or with an alkyllithium compound to obtain the corresponding 3-ether of estra-1,3,5(10),6,8,16 hexaene, reacting the latter compound with an organic peracid to obtain the corresponding 3-ether of 16α,17α-epoxyestra-1,3,5(10),6,8-pentaene, reducing said last-named compound with lithium aluminium hydride to the corresponding 3-ether of 17α-dihydroequilenin said obtaining. 17α-dihydroequilenin therefrom by removal of the ether group. 17α-dihydroequilenin is a natural occurring estrogen, also useful as an intermediate in the preparation of 17α-dihydroequilin, and a method for that latter conversion is also given.

---

The present invention relates to a process for preparing 17α-dihydroequilenin, a naturally occurring estrogen which is also useful as an intermediate in the preparation of 17α-dihydroequilin, also a naturally occurring potent estrogen. The process for converting 17α-dihydroequilenin to 17α-dihydroequilin is described in my co-pending U.S. patent application S.N. 653,009, filed July 13, 1967, now Patent No. 3,470,159. Briefly, that last-named process comprises conversion of equilenin acetate to 17α-dihydroequilenin 17-tetrahydropyranyl ether 3-acetate and reduction of the latter with lithium in liquid ammonia followed by acid hydrolysis to yield 17α-dihydroequilin. It is a particular advantage of the process of this invention that it describes a new and important method for the preparation of 17α-dihydroequilenin and of its 17α-tetrahydropyranyl ether.

In the process of this invention, equilenin (I) is first converted to its benzyl or 2-tetrahydropyranyl ether (II) (R=benzyl or 2-tetrahydropyranyl). The ether derivative of Formula II is allowed to react with an aryl sulfonylhydrazide, for example, phenyl, p-tolyl, p-bromophenyl, p-chlorophenyl or 2-naphthylsulfonylhydrazide to yield the corresponding sulfonylhydrazide of Formula III in which $R^1$ represents the phenyl-, the p-tolyl-, the p-bromophenyl, the p-chlorophenyl or the 2-naphthyl group.

Treatment of this last-named compound of Formula III with lithium aluminum hydride or with an alkyllithium compound such as, for example, methyllithium or n-butyllithium, eliminates the sulfonylhydrazone group and introduces a double bond in the 16,17-position to give the corresponding 3-ether of estra-1,3,5(10),6,8,16-hexaene of Formula IV. Treatment of said last-named compound with an organic peracid such as, for example, peracetic, perbenzoic, m-chloroperbenzoic or monoperphthalic acid gives the corresponding 3-ether or 16α,17α-epoxyestra-1,3,5(10),6,8-pentaene of Formula V. Reduction of said last-named compound with lithium aluminum hydride than yields the corresponding 3-ether of 17α-dihydroequilenin of Formula VI from which 17α-dihydroequilenin (VII) is obtained by hydrogenolysis of the 3-benzyl ether group for example with palladium on carbon. A 2-tetrahydropyranyl group in postion 3 of compound VI is removed by treatment with dilute mineral acid in solution in a lower alkanol also to give 17α-dihydroequilenin.

If it is desired to prepare 17α-dihydroequilin, I prefer to use 17α-dihydroequilenin 3-benzyl ether (VI, R=benzyl) as the starting material and converting said compound to its 17-(2′-tetrahydropyranyl) ether of Formula VIII by treating it with dihydropyran in the presence of an acid catalyst for example, p-toluenesulfonic acid. Hydrogenolysis of said last-named compound for example, with palladium on carbon yields 17α-dihydroequilenin 17-(2-tetrahydropyranyl) ether of Formula IX.

Reduction of said last-named compound with an alkali metal such as lithium, sodium, or potassium in liquid ammonia in the same manner as described in my co-pending U.S. patent application cited above, followed by acid hydrolysis of the tetrahydropyranyl ether group yields 17α-dihydroequilin of Formula X.

The following examples and formulae, in which R represents the benzyl or the 2-tetrahydropyranyl group and R′ represents an aryl group as defined above, will illustrate this invention.

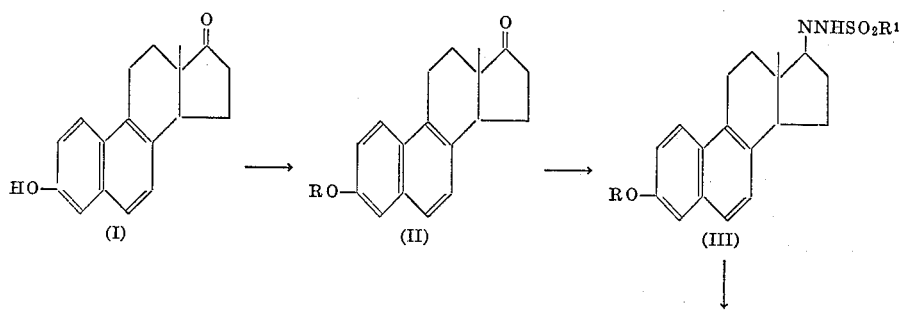

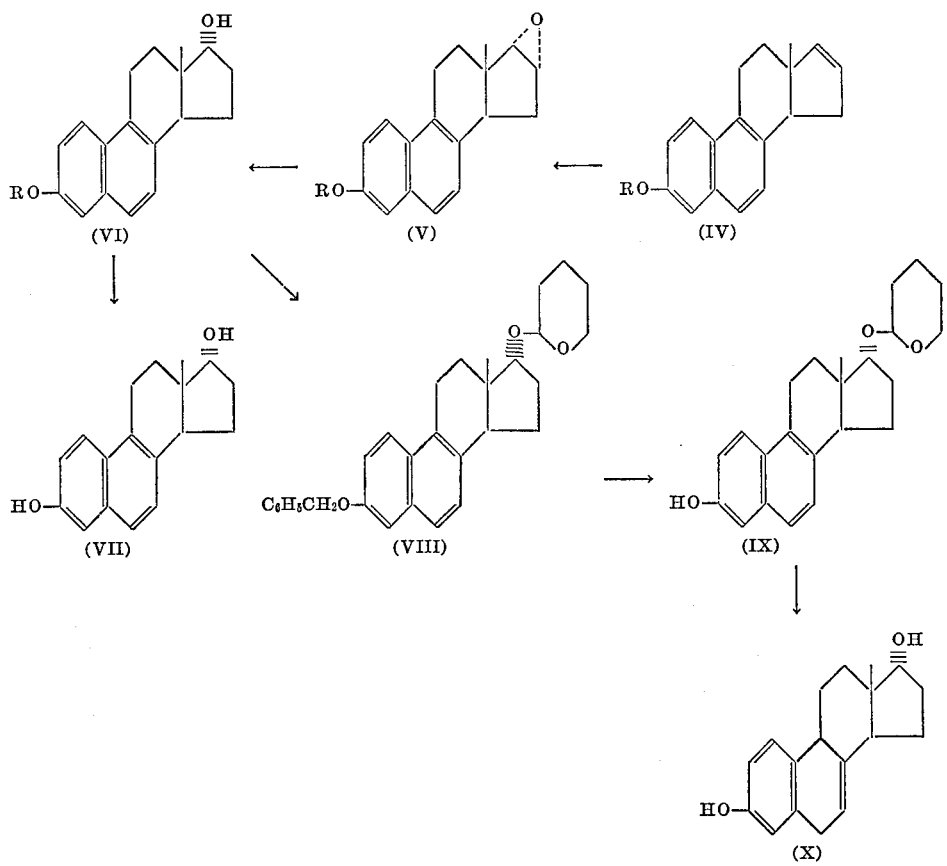

EXAMPLE 1

Equilenin benzyl ether p-toluenesulfonylhydrazone

To a solution of 29.1 g. of equilenin benzyl ether (Heer, Billeter and Miescher, Helv. Chim. Acta. 28, 991 (1945)) in 290 ml. of warm benzene is added 29 g. of p-toluenesulfonylhydrazide and 204 ml. of ethanol. The solution is heated under reflux for 24 hours, cooled, and filtered, yielding the tosylhydrazone as a colourless solid, M.P. 226–227° C. (dec.).

By substituting benzenesulfonylhydrazide, p-bromobenzenesulfonylhydrazide, p-chlorobenzenesulfonylhydrazide or 2-naphthylsulfonylhydrazide for p-toluenesulfonylhydrazide in the above experiment, the corresponding sulfonylhydrazones of equilenin benzyl ether can be obtained.

EXAMPLE 2

Equilenin 2-tetrahydropyranyl ether p-toluenesulfonylhydrazone

A mixture of 2.0 g. of equilenin, 1 ml. of dihydropyran and 40 mg. of p-toluenesulfonic acid in 20 ml. of benzene is stirred at room temperature for 2 hours. The acid is neutralized with pyridine and the solution is washed with water, dried and evaporated. To the residue is added 2.8 g. of p-toluenesulfonylhydrazide and 40 ml. of methanol and the solution is heated under reflux for 4 hours. Concentration and dilution with water gives the toluenesulfonylhydrazone as a pinkish solid, M.P. 238–240° (dec.).

EXAMPLE 3

3-benzyloxyestra-1,3,5(10),6,8,16-hexaene

Equilenin benzyl ether p-tosylhydrazone (36.0 g.) is added to a stirred solution of methyllithium (made from 46.0 g. of methyl iodide and 4.1 g. of lithium wire in 500 ml. of ether) under nitrogen. The hydrazone slowly dissolves with gas evolution and the mixture becomes reddish-brown. After stirring for 1.5 hours at room temperature the mixture is cooled in ice and 100 ml. of water is added slowly. The organic phase is diluted with 100 ml. of benzene, washed with water, dried, and evaporated. The crude product is dissolved in 1:1 benzene-petroleum ether and the solution is filtered through a column of deactivated silica gel. Crystallization of the eluted product from methylene chloride-methanol gives the hexaene, M.P. 134–135° C.

Similarly, treatment of the benzenesulfonylhydrazone, the p-bromobenzenesulfonylhydrazone, the p-chlorobenzenesulfonylhydrazone, or the 2-naphthylsulfonylhydrazone of equilenin benzyl ether with methyllithium leads to 3-benzyloxyestra-1,3,5(10),6,8,16-hexaene.

EXAMPLE 4

3-(2-tetrahydropyranyloxy)estra-1,3,5(10),6,8,16-hexaene

To a suspension of 2.8 g. of lithium aluminium hydride in 50 ml. of dioxane is added 1.8 g. of equilenin 2-tetrahydropyranyl ether p-toluenesulfonylhydrazone in 30 ml. of tetrahydrofuran and the mixture is stirred and heated under reflux overnight. Ethyl acetate is added followed by saturated aqueous potassium sodium tartrate solution to precipitate the inorganic salts. Filtration, evaporation, and chromatography on silica gel gives the hexaene, characterized by a band at 720 cm.$^{-1}$ in its infrared spectrum.

EXAMPLE 5

3-benzyloxy-16α,17α-epoxyestra-1,3,5(10),6,8-pentaene

To a stirred solution of 11.8 g. of 3-benzyloxyestra-1,3,5(10),6,8,16-hexaene in 60 ml. of benzene and 60 ml. of ethyl acetate containing 12.0 g. of anhydrous sodium acetate is added dropwise 20 ml. of 40% peracetic acid. After stirring at room temperature overnight and then at 45° C. for 2 hours, the mixture is diluted with benzene and washd with water, sodium bicarbonate solution and water again. The crude product obtained on drying and removal of solvent is crystallized from methylene chloride-methanol yielding the epoxide, M.P. 176–177.5°.

Similar treatment of 3-(2-tetrahydropyranyloxy)-estra-1,3,5(10),6,8,16-hexaene with peracetic, m-chloroperbenzoic, perbenzoic, or monoperphthalic acid leads to 3-(2 - tetrahydropyranyloxy) - 16α,17α - epoxyestra - 1,3,5(10),6,8-pentaene.

EXAMPLE 6

3-benzyloxyestra-1,3,5(10),6,8-pentaen-17α-ol

To a stirred suspension of 3.0 g. of lithium aluminium hydride in 75 ml. of ether is added dropwise a solution of 9.8 g. of 3-benzyloxy-16α,17α-epoxyestra-1,3,5(10)6,8-pentaene in 150 ml. of tetrahydrofuran. After heating under reflux for 2.5 hours, excess hydride is decomposed by adding ethyl acetate to the ice-cooled mixture, followed by saturated aqueous sodium potassium tartrate solution to precipitate inorganic salts. The mixture is filtered and the solid obtained by evaporation of the filtrate is crystallized from methylene chloride-methanol to yield 3-benzyloxyestra-1,3,5(10),6,8-pentaen-17α-ol, M.P. 125–127° C.

Similarly, reduction of 3-(2-tetrahydropyranyloxy)-16α,17α-epoxyestra-1,3,5(10),6,8-pentaene with lithium aluminium hydride yields 3-(2-tetrahydropyranyloxy)-estra-1,3,5(10),6,8-pentaen-17α-ol.

EXAMPLE 7

17α-dihydroequilenin (a) A solution of 500 mg. of 3-benzyloxyestra-1,3,5(10),6,8-pentaen-17α-ol in 10 ml. of ethyl acetate is hydrogenated at atmospheric pressure in the presence of 250 mg. of 5% palladium on charcoal. When hydrogen absorption is complete, the catalyst is filtered, the filtrate is concentrated to dryness and the residue is crystallized from acetone-hexane and then from acetone-benzene to yield 17α-dihydroequilenin, M.P. 214–216° C. This compound is identical with 17α-dihydroequilenin obtained from natural sources.

(b) To 500 mg. of 3-(2-tetrahydropyranyloxy)estra-1,3,5(10),6,8-pentaen-17α-ol in 10 ml. of methanol is added 1 ml. of 10% hydrochloric acid. After one hour at room temperature, dilution with water and crystallization of the precipitated product yields 17α-dihydroequilenin.

EXAMPLE 8

17α-(2-tetrahydropyranyloxy)estra-2,3,5(10),6,8-pentaen-3-ol

A mixture of 10.0 g. of 3-benzyloxyestra-1,3,5(10),6,8-pentaen-17α-ol, 160 mg. of p-toluenesulfonic acid and 7.5 ml. of dihydropyran in 180 ml. of benzene is stirred at room temperature for 2 hours. After neutralization with 0.3 ml. of pyridine, the solution is washed with water, dried, and evaporated. The resulting oil is dissolved in 150 ml. of ethyl acetate and hydrogenated at atmospheric pressure in the presence of 6 g. of 5% palladium on carbon. When uptake of hydrogen ceases after 2 hours, the catalyst is removed by filtration. Evaporation of solvent then gives 17α-(2-tetrahydropyranyloxy)estra-1,3,5(10),6,8-pentaen-3-ol as a pale yellow foam.

EXAMPLE 9

17α-dihydroequilin

Sodium hydride (1.2 g. of 50% dispersion in mineral oil) is washed four times with petroleum ether by decantation.

The adhering solvent is blown off under a stream of nitrogen, 10 ml. of tetrahydrofuran is added, and a solution of 5.2 g. of 17α-(2-tetrahydropyranyloxy)-estra-1,3,5(10),6,8-pentaen-3-ol in 50 ml. of tetrahydrofuran is added dropwise with stirring under nitrogen. The solution is stirred for 45 minutes and transferred to a dropping funnel attached to a flask containing a solution of 8.0 g. of potassium in 140 ml. of liquid ammonia cooled to −70° C. in a Dry Ice-acetone bath. The stirred solution is added dropwise over a period of 20 minutes and stirring is continued at −70° C. for one hour. Ammonium chloride is then added in small portions until the colour is discharged and the ammonia is allowed to evaporate under a stream of nitrogen. Ether and water are added, and the ether extract is washed with water, dried, and evaporated to give a yellow foam. This material is dissolved in 50 ml. of methanol and the solution is treated with 5 ml. of 10% hydrochloric acid. After one hour at room temperature, the solution is diluted with water and extracted with ether. The material obtained from the ether extract is chromatographed on silica gel and crystallized from aqueous methanol to yield 17α-dihydroequilin identical with material obtained from natural sources.

In the same manner, when using equivalent amounts of lithium or sodium instead of potassium, 17α-dihydroequilin is also obtained.

I claim:
1. The process of preparing 17α-dihydroequilenin which comprises converting equilenin to an ether derivative thereof of formula

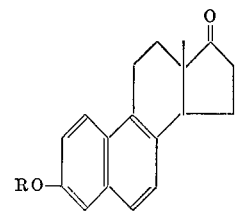

wherein R represents benzyl or the 2-tetrahydropyranyl group; treating said ether derivative with an aryl sulfonylhydrazide, thereby obtaining the corresponding sulfonyl hydrazide derivative of formula

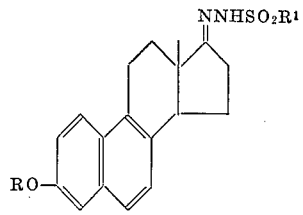

wherein R is as above defined, R¹ represents phenyl, p-tolyl, p-bromophenyl, p-chlorophenyl or the 2-naphthyl group; treating said sulfonylhydrazide derivative with a reagent selected from lithum aluminum hydride, methyllithium or n-butyllithium, thereby securing a compound of formula

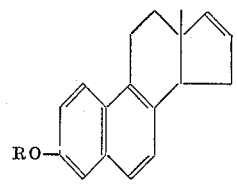

wherein R is as above defined; treating said last-named compound with an organic peracid, thereby securing the corresponding 3-ether derivative of formula

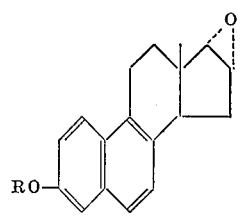

R being as above defined, treating said 3-ether derivative with lithium aluminum hydride, thereby obtaining a compound of formula

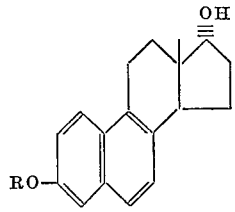

R being as above defined; and subjecting said compound to hydrogenolysis by treating with hydrogen in the presence of palladium catalyst, thereby securing 17α-dihydroequilenin.

2. The process of preparing 17α - dihydroequilenin which comprises converting equilenin to an ether derivative thereof of formula

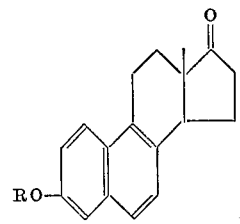

wherein R represents benzyl or the 2-tetrahydropyranyl group; treating said ether derivative with an aryl sulfonylhydrazide thereby obtaining the corresponding sulfonyl hydrazide derivative of formula

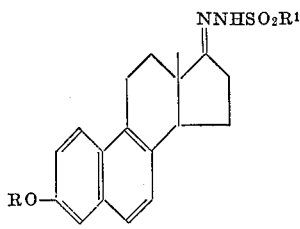

wherein R is as above defined, $R^1$ represents phenyl, p-tolyl, p-bromophenyl, p-chlorophenyl or the 2-naphthyl group; treating said sulfonylhydrazide derivative with a reagent selected from lithium aluminum hydride, methyllithium or n-butyllithium, thereby securing a compound of the formula

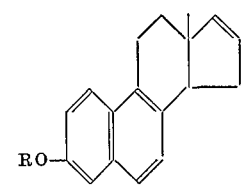

wherein R is as above defined; treating said last-named compound with an organic peracid, thereby securing the corresponding 3-ether derivative of formula

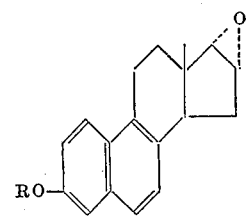

R being as above defined, treating said 3-ether derivative with lithium aluminum hydride, thereby obtaining a compound of formula

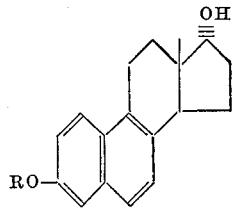

R being as above defined; and subjecting said compound to the action of a mineral acid, thereby securing 17α-dihydroequilenin.

3. The process of preparing 17α-dihydroequilin which comprises treating a compound of the formula

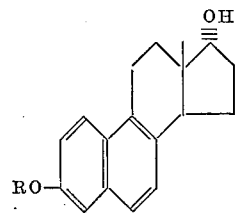

wherein R is benzyl with dihydropyran in the presence of an acid catalyst, thereby securing a compound of formula

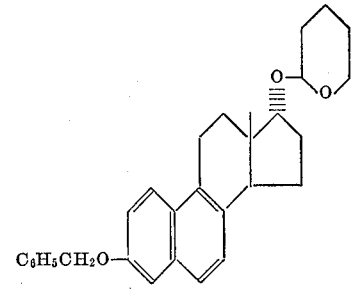

subjecting said compound to the action of hydrogen in the presence of palladium as catalyst, thereby securing 17α-dihydroequilenin 17 - (2 - tetrahydropyranyl) ether of formula

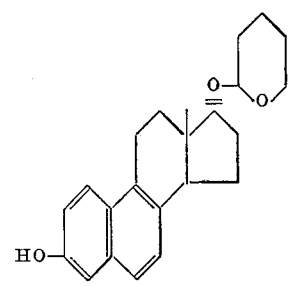

and reducing said 17-(2-tetrahydropyranyl) ether derivative by treatment thereof with potassium in liquid ammonia, followed by acid hydrolysis of the tetrahydropyranyl ether group, thereby securing 17α-dihydroequilin.

References Cited

UNITED STATES PATENTS 3,347,854   10/1967   Lenhard et al. _____ 260—239.55

ELBERT L. ROBERTS, Primary Examiner

U.S. Cl. X.R.

260—239.55